(12) United States Patent
Errickson et al.

(10) Patent No.: US 8,432,793 B2
(45) Date of Patent: Apr. 30, 2013

(54) MANAGING RECOVERY OF A LINK VIA LOSS OF LINK

(75) Inventors: Richard K. Errickson, Poughkeepsie, NY (US); Leonard W. Helmer, Jr., Stone Ridge, NY (US); John S. Houston, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 12/051,630

(22) Filed: Mar. 19, 2008

(65) Prior Publication Data

US 2009/0216923 A1   Aug. 27, 2009

Related U.S. Application Data

(60) Provisional application No. 61/031,315, filed on Feb. 25, 2008.

(51) Int. Cl.
*H04L 12/26* (2006.01)

(52) U.S. Cl.
USPC .......................................... 370/225; 370/242

(58) Field of Classification Search .......... 370/216–228, 370/242
See application file for complete search history.

(56) References Cited

U.S. PATENT DOCUMENTS

| | | | |
|---|---|---|---|
| 3,643,227 A | 2/1972 | Smith et al. | |
| 4,993,014 A * | 2/1991 | Gordon | 370/225 |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,524,212 A | 6/1996 | Somani et al. | |
| 5,764,641 A | 6/1998 | Lin | |
| 5,777,987 A | 7/1998 | Adams et al. | |
| 6,073,181 A | 6/2000 | Holland et al. | |
| 6,181,677 B1 | 1/2001 | Valli et al. | |
| 6,185,629 B1 | 2/2001 | Simpson et al. | |
| 6,289,386 B1 | 9/2001 | Vangemert | |
| 6,363,457 B1 | 3/2002 | Sundberg | |
| 6,483,804 B1 | 11/2002 | Muller et al. | |
| 6,507,567 B1 * | 1/2003 | Willars | 370/321 |
| 6,741,552 B1 | 5/2004 | McCrosky et al. | |
| 6,862,609 B2 | 3/2005 | Merkey | |
| 6,993,032 B1 | 1/2006 | Dammann et al. | |
| 7,093,024 B2 | 8/2006 | Craddock et al. | |
| 7,200,704 B2 | 4/2007 | Njoku et al. | |
| 7,283,473 B2 | 10/2007 | Arndt et al. | |
| 7,290,077 B2 | 10/2007 | Gregg et al. | |
| 7,366,813 B2 | 4/2008 | Gregg et al. | |

(Continued)

OTHER PUBLICATIONS

"Infiniband Architecture Specification vol. 1", Release 1.0.a, Jun. 19, 2001, pp. 40, 71, 193-194, 366-370, 665-667.*

(Continued)

*Primary Examiner* — Chirag Shah
*Assistant Examiner* — Jenkey Van
(74) *Attorney, Agent, or Firm* — Cantor Colburn LLP; Steven Chiu

(57) ABSTRACT

A computer program product, apparatus and method for managing recovery of a link in a multi-tasking multi-processor environment. An exemplary embodiment includes shutting off timers for a failed channel associated with the communications link, storing a loss of link condition in a data structure, disabling communications on the failed channel and sending an external notification of the loss of link condition.

22 Claims, 4 Drawing Sheets

U.S. PATENT DOCUMENTS

| | | | |
|---|---|---|---|
| 7,444,641 | B1 | 10/2008 | Diepstraten et al. |
| 7,467,402 | B2 | 12/2008 | Pennington et al. |
| 7,602,774 | B1 | 10/2009 | Sundaresan et al. |
| 7,613,183 | B1 | 11/2009 | Brewer et al. |
| 2001/0014954 | A1* | 8/2001 | Purcell et al. ............ 714/4 |
| 2001/0030943 | A1 | 10/2001 | Gregg et al. |
| 2002/0091826 | A1* | 7/2002 | Comeau et al. ............ 709/226 |
| 2002/0107903 | A1 | 8/2002 | Richter et al. |
| 2002/0194245 | A1 | 12/2002 | Simpson et al. |
| 2003/0005039 | A1 | 1/2003 | Craddock et al. |
| 2003/0018828 | A1 | 1/2003 | Craddock et al. |
| 2003/0061379 | A1 | 3/2003 | Craddock et al. |
| 2004/0123068 | A1* | 6/2004 | Hashimoto ............ 711/206 |
| 2004/0154007 | A1 | 8/2004 | Koizumi et al. |
| 2004/0202189 | A1 | 10/2004 | Arndt et al. |
| 2004/0221070 | A1 | 11/2004 | Ortega, III et al. |
| 2005/0018669 | A1 | 1/2005 | Arndt et al. |
| 2005/0060374 | A1 | 3/2005 | Phillips |
| 2005/0060445 | A1 | 3/2005 | Beukema et al. |
| 2005/0080933 | A1 | 4/2005 | Herring |
| 2005/0120237 | A1 | 6/2005 | Roux et al. |
| 2005/0144313 | A1 | 6/2005 | Arndt et al. |
| 2006/0048214 | A1 | 3/2006 | Pennington et al. |
| 2006/0176167 | A1 | 8/2006 | Dohrmann |
| 2006/0230185 | A1 | 10/2006 | Errickson et al. |
| 2006/0230209 | A1 | 10/2006 | Gregg et al. |
| 2006/0230219 | A1 | 10/2006 | Njoku et al. |
| 2007/0239963 | A1 | 10/2007 | Yao et al. |
| 2007/0245050 | A1 | 10/2007 | Gregg et al. |
| 2008/0028116 | A1 | 1/2008 | Gregg et al. |
| 2008/0109891 | A1 | 5/2008 | Greenwald et al. |
| 2008/0196041 | A1 | 8/2008 | Gregg et al. |
| 2009/0019312 | A1 | 1/2009 | Kulkarni et al. |
| 2009/0094603 | A1 | 4/2009 | Hiltgen et al. |
| 2009/0217238 | A1 | 8/2009 | Errickson et al. |

OTHER PUBLICATIONS

Jeong et al.; A study on TCP Buffer Management Algorithim for Improvement on Network Performance in Grid Environment; Jun. 6-9, 2004 pp. 281-288.

Huang et al., InfiniBand Support in Xen Virtual Machine Environment, Technical Report, OSU-CISRC-10/05-TR63, Oct. 2005.

Wu et al., "Design of An InfiniBand Emulator over Myrinet: Challenges, Implementation, and Performance Evaluation", Technical Report, OSU-CISRC-2/01-TR03, 2003.

Non-Final Office Action dated Jun. 23, 2010 for U.S. Appl. No. 12/036,986.

Non-Final Office Action dated Jan. 29, 2010 for U.S. Appl. No. 12/036,979.

Notice of Allowance dated Jun. 23, 2010 for U.S. Appl. No. 12/036,979.

Non-Final Office Action dated Oct. 1, 2010 ffor U.S. Appl. No. 12/037,046.

Non-Final Office Action dated May 17, 2010 for U.S. Appl. No. 12/037,046.

Office Action made Final dated Oct. 6, 2010 for U.S. Appl. No. 12/037,048.

Non-Final Office Action dated Apr. 9, 2010 for U.S. Appl. No. 12/037,048.

Office Action Made Final dated Aug. 12, 2010 for U.S. Appl. No. 12/051,634.

Non-Final Office Action dated Mar. 22, 2010 for U.S. Appl. No. 12/051,634.

Non-Final Office Action dated May 13, 2010 for U.S. Appl. No. 12/051,631.

Non-Final Official Action dated Mar. 22, 2011 for U.S. Appl. No. 12/036,983.

Advisory Action dated Feb. 16, 2011 for U.S. Appl. No. 12/036,986.

Notice of Allowance dated Apr. 22, 2011 for U.S. Appl. No. 12/037,046.

Office Action made Final dated Dec. 8, 2010 for U.S. Appl. No. 12/036,986.

Notice of Allowance dated Feb. 7, 2011 for U.S. Appl. No. 12/036,979.

Notice of Allowance dated Jan. 11, 2011 for U.S. Appl. No. 12/037,048.

Notice of Allowance dated Oct. 15, 2010 for U.S. Appl. No. 12/051,631.

Non-Final Office Action dated Nov. 14, 2011 for U.S. Appl. No. 12/058,034.

Non-Final Office Action dated Feb. 8, 2012 for U.S. Appl. No. 12/058,054.

Non-Final Office Action dated Dec. 1, 2011 for U.S. Appl. No. 12/051,634.

Office Action Made Final dated Jan. 4, 2012 for U.S. Appl. No. 12/051,628.

Non-Final Office Action dated Jul. 6, 2011 for U.S. Appl. No. 12/051,628.

Notice of Allowance dated Mar. 9, 2012 for U.S. Appl. No. 12/058,034.

Final Office Action for U.S. Appl. No. 12/051,634—Dated May 9, 2012.

\* cited by examiner

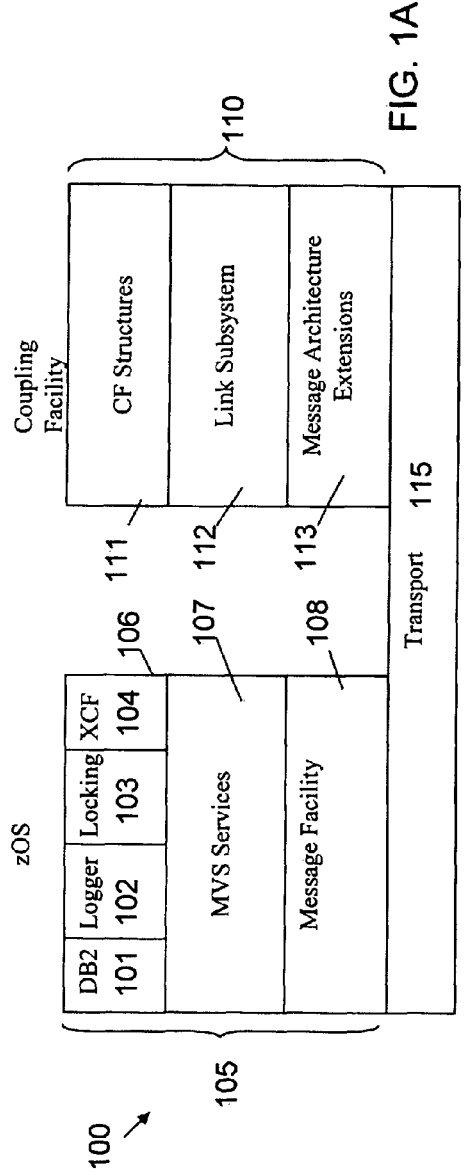
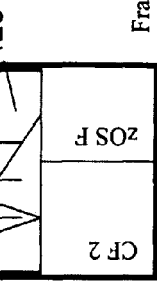
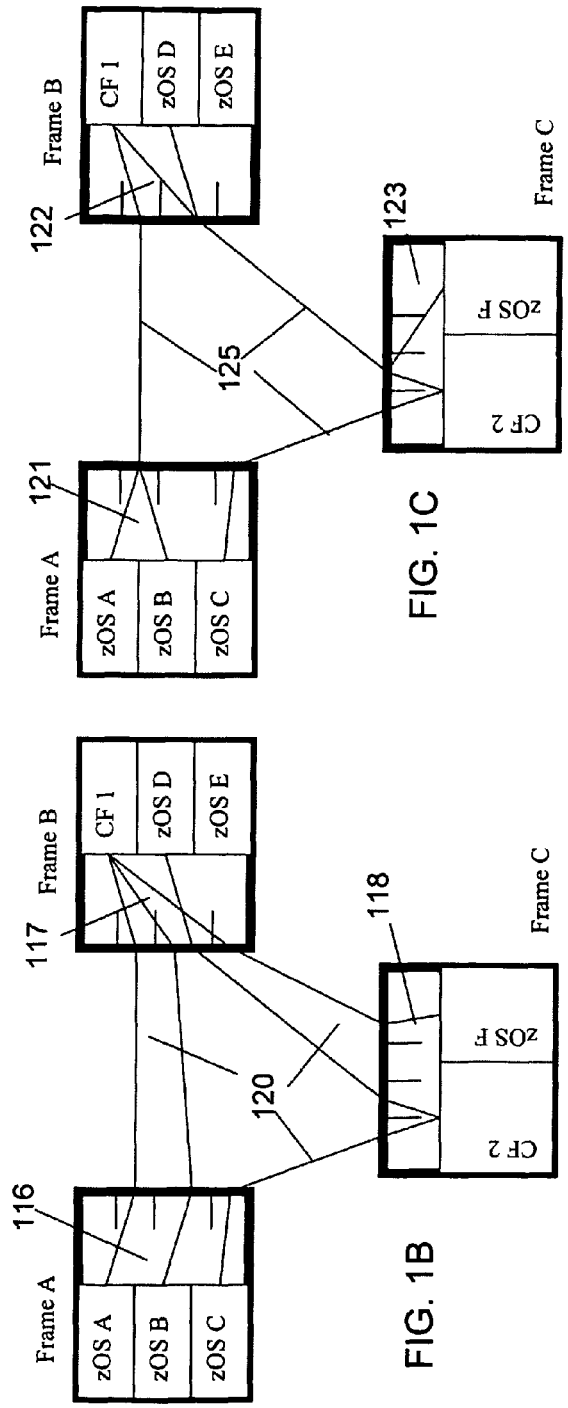

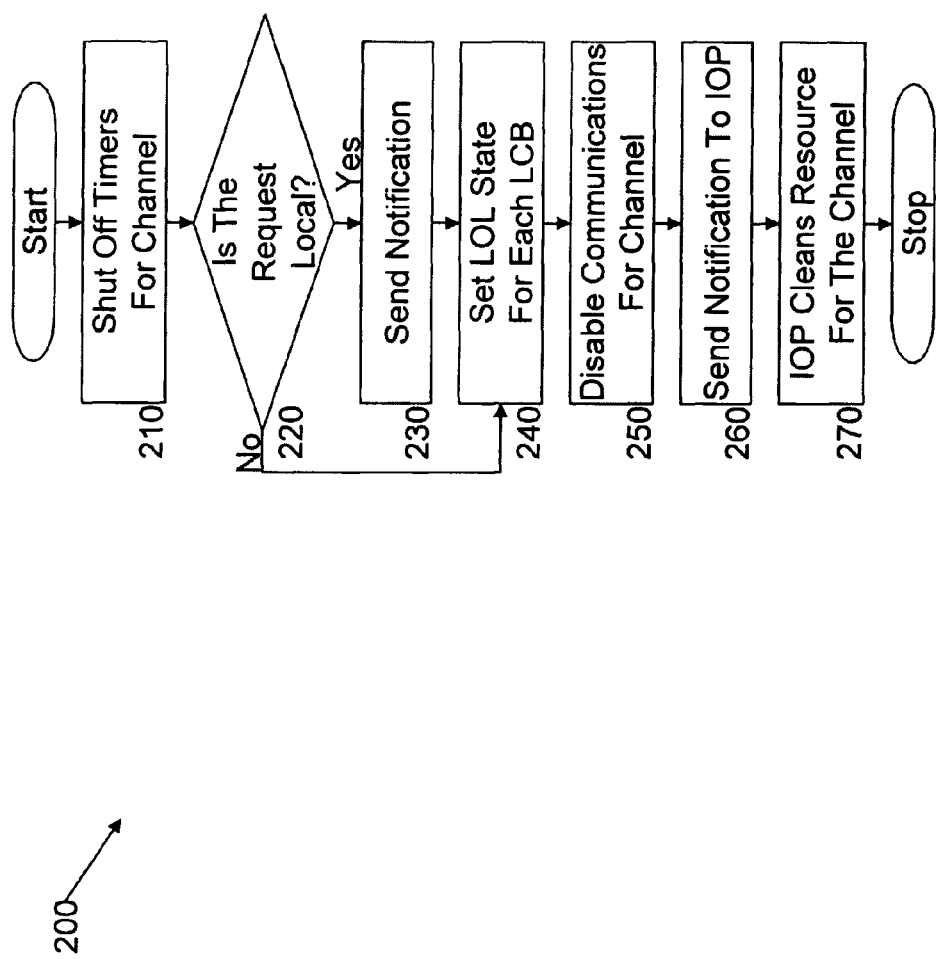

MANAGING RECOVERY OF A LINK VIA LOSS OF LINK

Priority based on U.S. Provisional Patent Application Ser. No. 61/031,315, filed Feb. 25, 2008, and entitled "MULTI-TASKING MULTI-PROCESSOR ENVIRONMENTS OVER INFINIBAND" is claimed, the entire contents of which is incorporated by reference in its entirety.

BACKGROUND OF THE INVENTION

1. Field of Invention

The present disclosure relates generally to multi-tasking multi-processor environments, and in particular, to managing recovery of a link in a multi-tasking multi-processor environment.

2. Description of Background

When operating a communications link in a multi-tasking multi-processor environment, numerous failures can occur and there are a variety of ways in which the communication link can be/recovered. For example, if a channel needs to be recovered in the existing coupling technologies for multi-tasking multi-processor environment, the operation is supported by dedicated hardware. The hardware link can be reset in order to achieve this Loss of Link operation, often by dropping light or cutting power.

In the case of the new coupling technology based upon industry standard Infiniband, multiple channels can be emulated across a single physical link. Therefore, there is no hardware assist that can be called upon to aid in the recovery of the communication link. As such, recovery is left up to the firmware, which must be able to handle such recovery on a single channel without impacting the other channels that share the physical link.

BRIEF SUMMARY OF THE INVENTION

An exemplary embodiment includes a computer program product for managing recovery of a communications link in a multi-tasking multi-processor environment, the computer program product including a tangible storage medium readable by a processing circuit and storing instructions for execution by the processing circuit for performing a method including shutting off timers for a failed channel associated with the communications link, storing a loss of link condition in a data structure, disabling communications on the failed channel and sending an external notification of the loss of link condition.

Another exemplary embodiment includes an apparatus for managing recovery of a communications link in a multi-tasking multi-processor environment, the computer program product including a processor performing a method including shutting, off timers for a failed channel, associated with the communications link, storing a loss of link condition in a data structure, disabling communications on the failed channel and sending an external notification of the loss of link condition.

A further exemplary embodiment includes a method for managing recovery of a communications link in a multi-tasking multi-processor environment, the method including shutting off timers for a failed channel associated with the communications link, storing a loss of link condition in a data structure, disabling communications on the failed channel and sending an external notification of the loss of link condition.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a flow chart of a method for managing recovery of a communications link in a multi-tasking multi-processor environment.

The detailed description explains the preferred embodiments of the invention, together with advantages and features, by way of example with reference to the drawings.

DETAILED DESCRIPTION OF THE INVENTION

In accordance with an aspect of the present invention, the systems, methods and computer program products described herein implement an out-of-band command and control interface to guide the process of managing recovery of a link via loss of link in a multi-tasking multi-processor environment. In exemplary embodiments, in the event of a communication link failure a host system sends a message to a remote partner system to indicate that a channel recovery is required. The code associated with the systems then systematically disconnects the channel resources and ensures that these resources are cleaned up and made available for re-use. Once the aforementioned process is complete, the channel can be brought up again.

Figure 1D:
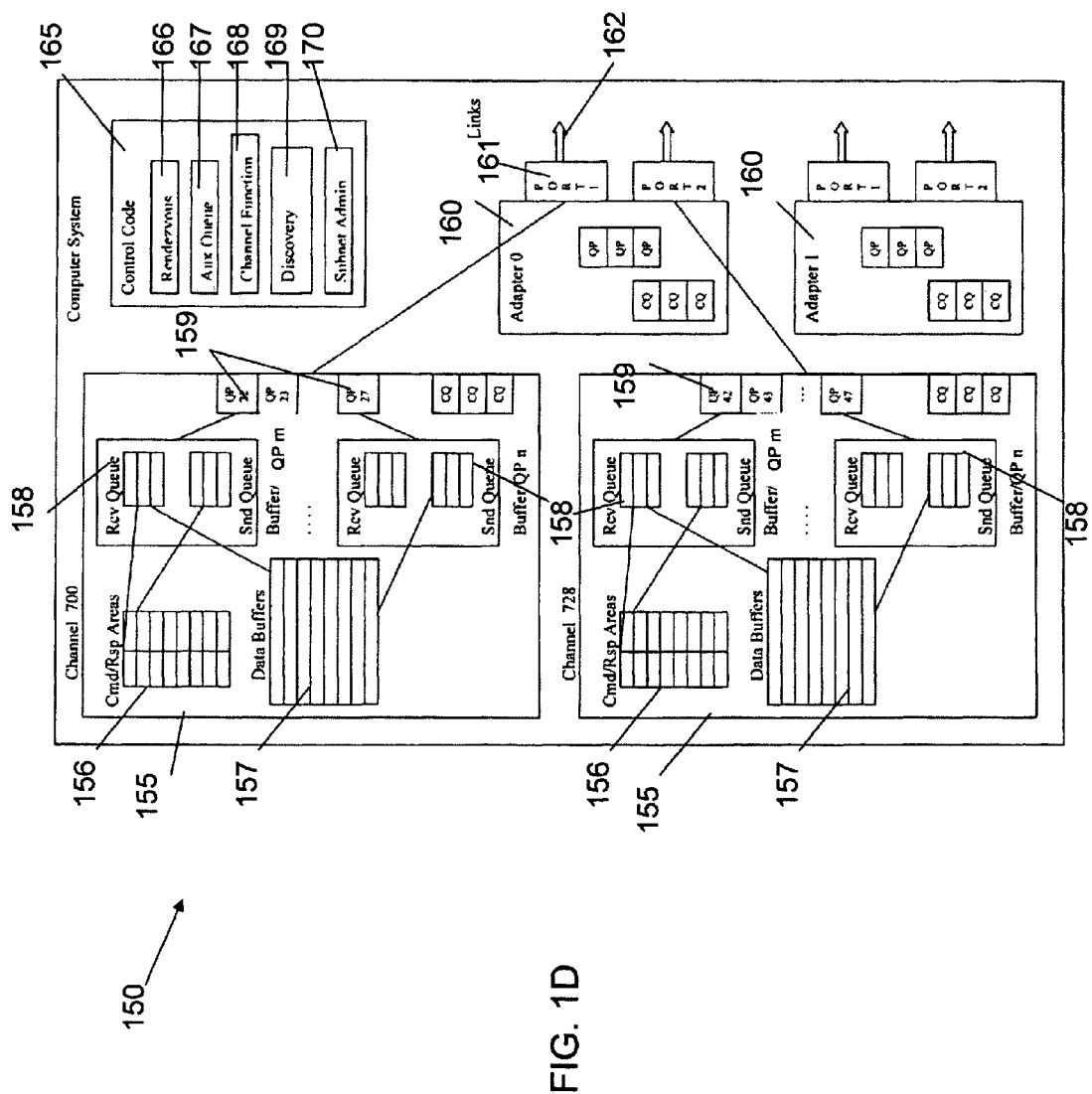
FIG. 1A illustrates an exemplary embodiment of a multi-tasking multi-processor Infiniband system.
FIG. 1B illustrates an example of a multi-tasking multi-processor environment.
FIG. 1C illustrates an example of a multi-tasking multi-processor environment in accordance with an exemplary embodiment.
FIG. 1 D illustrates an example of a multi-tasking multi-processor environment in accordance with an exemplary embodiment.

FIG. 1A illustrates an exemplary embodiment of a multi-tasking multi-processor Infiniband system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 is supported by Infiniband. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

In exemplary embodiments, in a loss of link (LOL) scenario, the recovery is a temporary transition to recover from a problem that could not be corrected in a less intrusive fashion. Therefore, the transition has to be as fast and efficient as possible. Recovery of a channel can result from many different situations, including: timeout of communications across the link as detected by the heartbeat support; a communication error that caused a buffer to go into error; a software bug that compromised the integrity of the communications across the channel; an operating system request to recycle the channel; an operator request to disable the channel; and the remote partner informing the local channel that the channel is going through a loss of link operation.

FIG. 2 is a flow chart of a method for managing recovery of a communications link in a multi-tasking multi-processor environment. The flow chart provides an overview of the operations that take place in order to disable and clean up the channel so that it is no longer operational. At block 210, the system 200 shuts off all timers for the channel that is experiencing the communication failure. This operation ensures that no asynchronous timer pops associated with this channel remain to be processed, which could jeopardize the state of the channel. At block 220, the system 200 determines if the originator of the loss of signal request is local. If the request is local, then the system 200 sends a notification at block 230 to a remote partner that a communication failure has occurred. At block 240, the system 200 sets the state to loss of link (LOL) in progress for each link control block (LCB). If at block 220, the request was not local, then the flow proceeds directly to block 240. At block 250, the system 200 disables communications for the channel that has failed. At block 260, the system 200 sends a notification to an I/O processor (or an object broker) of the loss of link. At block 270, the I/O processor then cleans up the resources for the channel.

Once the channel has been disabled, the I/O processor (IOP) can conditionally begin to restore the channel to operation, which depends upon the original cause of the loss of link. In an exemplary embodiment, the IOP initializes its control blocks for the channel, and then informs the channel layer to start the hardware dependent initialization. The channel initialization process of ensuring that the control blocks associated with the channel are in their initial state, establishing and connecting the queue pairs for the out of band signaling connection, negotiating buffer counts and sizes, connecting each of the queue pairs associated with data buffers, and then exchanging Node Descriptor (system identification information) ensures that the channel is now clean and ready to resume normal data communications.

Much of the coordination of this activity resides in the firmware, and involves the auxiliary queue pair. The auxiliary queue pair, or out of band signaling, manages not only the breaking down of the channel (the loss of link operation), but also the entire rebuilding and connecting of the channel across the link.

Technical effects of exemplary embodiments include the ability to recover a loss of link for existing coupling connections emulated in firmware. A single channel which is multiplexed across a shared physical link is capable of being recovered without in any way impacting the other channels that share the physical connection.

Figure 3:
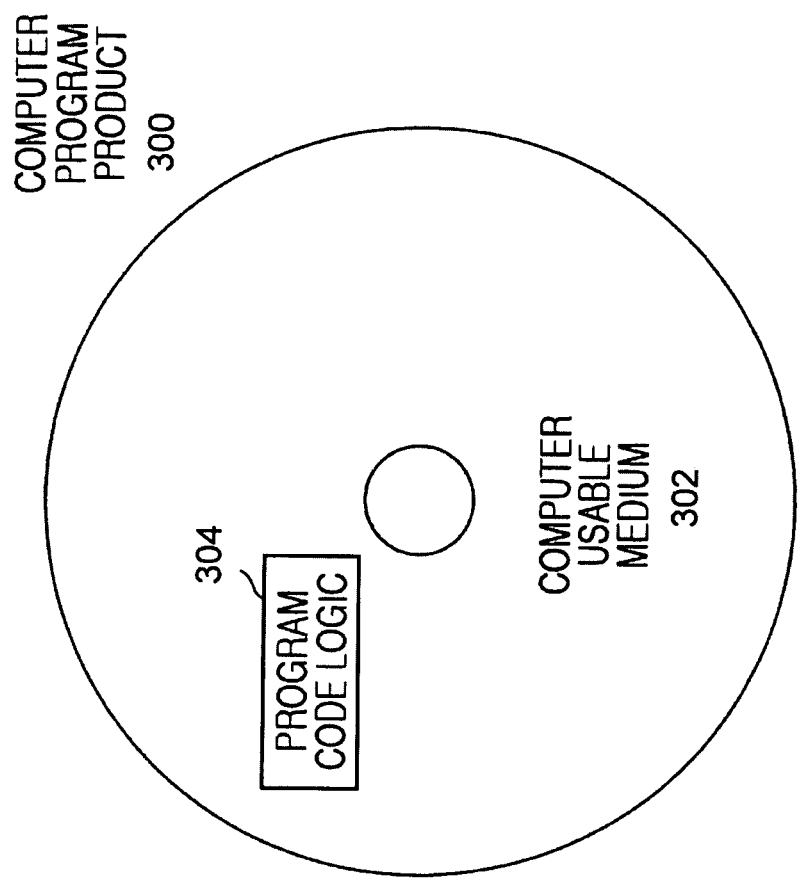
FIG. 3 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 300 as depicted in FIG. 3 on a computer usable medium 302 with computer program code logic 304 containing instructions embodied in tangible media as an article of manufacture. Exemplary articles of manufacture for computer usable medium 302 may include floppy diskettes, CD-ROMs, hard drives, universal serial bus (USB) flash drives, or any other computer-readable storage medium, wherein, when the computer program code logic 304 is loaded into and executed by a computer, the computer becomes an apparatus for practicing the invention. Embodiments include computer program code logic 304, for example, whether stored in a storage medium, loaded into and/or executed by a computer, or transmitted over some transmission medium, such as over electrical wiring or cabling, through fiber optics, or via electromagnetic radiation, wherein, when the computer program code logic 304 is loaded into and executed by a computer, the computer becomes an apparatus for practicing the invention. When implemented on a general-purpose microprocessor, the computer program code logic 304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for managing recovery of a communications link in a multi-tasking multi-processor environment, the computer program product comprising:

a tangible non-transitory storage medium readable by a processing circuit and storing instructions for execution by the processing circuit for performing a method comprising:

shutting off timers for a failed channel associated with the communications link, the failed channel being associated with a physical link;

storing a loss of link condition in a data structure;

disabling communications on the failed channel;

establishing a queue pair out-of-band connection in a channel that is multiplexed across the physical link;

sending an external notification, via the queue pair out-of-band connection, of the loss of link condition;

resuming, via the queue pair out-of-band connection, data communications on the failed channel, by rebuilding and connecting the failed channel in firmware across the physical link, thereby leaving the physical link intact; and handling channel path management via the queue pair, wherein the channel path management comprises a connection establishment with a remote system, heartbeat, and an invalidation of requests and other recovery actions.

2. The computer program product as claimed in claim 1 wherein the method further comprises determining if a request to the channel is local.

3. The computer program product as claimed in claim 2 wherein the method further comprises in response to the request being local, sending an external notification that a loss of link has occurred.

4. The computer program product as claimed in claim 1 wherein the external notification of the loss of link condition is sent to an object broker.

5. The computer program product as claimed in claim 1 wherein the external notification of the loss of link condition is sent to an I/O processor.

6. The computer program product as claimed in claim 1 wherein the method further comprises receiving a notification that resources for the channel have been cleaned up.

7. The computer program product as claimed in claim 1 wherein the method further comprises initializing control blocks for the channel associated with the communication link.

8. The computer program product as claimed in claim 7 wherein the method further comprises sending a notification to channel layers to initiate a hardware dependent initialization.

9. An apparatus for managing recovery of a communications link in a multi-tasking multi-processor environment, the apparatus comprising:

a processor performing a method stored in a non-transitory storage medium, comprising:

shutting off timers for a failed channel associated with the communications link, the failed channel being associated with a physical link;

storing a loss of link condition in a data structure;

disabling communications on the failed channel;

establishing a queue pair out-of-band connection in a channel that is multiplexed across the physical link;

sending an external notification, via the queue pair out-of-band connection, of the loss of link condition;

resuming, via the queue pair out-of-band connection, data communications on the failed channel, by rebuilding and connecting the failed channel in firmware across the physical link, thereby leaving the physical link intact; and handling channel path management via the queue pair, wherein the channel path management comprises a connection establishment with a remote system, heartbeat, and an invalidation of requests and other recovery actions.

10. The apparatus as claimed in claim 9 wherein the method further comprises determining if a request to the channel is local.

11. The apparatus as claimed in claim 10 wherein the method further comprises in response to the request being local, sending an external notification that a loss of link has occurred.

12. The apparatus as claimed in claim 9 wherein the method further comprises:

initializing control blocks for the channel associated with the communication link; and sending a notification to channel layers to initiate a hardware dependent initialization.

13. A method for managing recovery of a communications link in a multi-tasking multi-processor environment, the method comprising:

shutting off timers for a failed channel associated with the communications link, the failed channel being associated with a physical link;

storing a loss of link condition in a data structure;

disabling communications on the failed channel;

establishing a queue pair out-of-band connection in a channel that is multiplexed across the physical link;

sending an external notification, via the queue pair out-of-band connection, of the loss of link condition;

resuming, via the queue pair out-of-band connection, data communications on the failed channel, by rebuilding and connecting the failed channel in firmware across the physical link, thereby leaving the physical link intact; and handling channel path management via the queue pair, wherein the channel path management comprises a connection establishment with a remote system, heartbeat, and an invalidation of requests and other recovery actions.

14. The method as claimed in claim 13 further comprising determining if a request to the channel is local.

15. The method as claimed in claim 14 further comprising in response to the request being local, sending an external notification that a loss of link has occurred.

16. The method as claimed in claim 13 wherein the external notification of the loss of link condition is sent to an object broker.

17. The method as claimed in claim 13 wherein the external notification of the loss of link condition is sent to an I/O processor.

18. The method as claimed in claim 13 further comprising receiving a notification that resources for the channel have been cleaned up.

19. The method as claimed in claim 13 further comprising initializing control blocks for the channel associated with the communication link.

20. The method as claimed in claim 19 further comprising sending a notification to channel layers to initiate a hardware dependent initialization.

21. The method as claimed in claim 13 further comprising emulating channel protocols in the firmware running over a standardized transport.

22. The method as claim in claim 13 further comprising mapping buffers to the queue pair out-of-band connection, the buffers comprising a first buffer for receiving a command response and a second buffer for receiving data requests.

* * * * *